(12) United States Patent
Liu

(10) Patent No.: US 12,354,475 B2
(45) Date of Patent: Jul. 8, 2025

(54) INTERNET OF VEHICLES BASED DYNAMIC INFORMATION SENDING METHOD AND DEVICE

(71) Applicant: Shenzhen Yinwang Intelligent Technologies Co., Ltd., Shenzhen (CN)

(72) Inventor: Jianqin Liu, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 278 days.

(21) Appl. No.: 17/827,376

(22) Filed: May 27, 2022

(65) Prior Publication Data

US 2022/0292965 A1 Sep. 15, 2022

Related U.S. Application Data

(63) Continuation of application No. PCT/CN2020/098291, filed on Jun. 24, 2020.

(30) Foreign Application Priority Data

Nov. 30, 2019 (CN) .......................... 201911209132.4

(51) Int. Cl.
*H04W 4/44* (2018.01)
*G08G 1/0967* (2006.01)

(52) U.S. Cl.
CPC ........ *G08G 1/096766* (2013.01); *H04W 4/44* (2018.02)

(58) Field of Classification Search
CPC .. G08G 1/0133; G08G 1/0116; G08G 1/0112; G08G 1/0141; G08G 1/096716; G08G 1/096741; G01C 21/3885
See application file for complete search history.

(56) References Cited

U.S. PATENT DOCUMENTS

| | | | |
|---|---|---|---|
| 2006/0178807 A1* | 8/2006 | Kato | G08G 1/096894 340/995.13 |
| 2017/0352268 A1* | 12/2017 | Colella | G08G 1/0965 |
| 2018/0174451 A1* | 6/2018 | Rao | G01C 21/3461 |
| 2018/0195877 A1* | 7/2018 | Liao | G08G 1/096838 |

(Continued)

FOREIGN PATENT DOCUMENTS

| | | |
|---|---|---|
| CN | 101937458 A | 1/2011 |
| CN | 102230805 A | 11/2011 |

(Continued)

*Primary Examiner* — Hashim S Bhatti
(74) *Attorney, Agent, or Firm* — Leydig, Voit & Mayer, Ltd.

(57) ABSTRACT

This application relates to the field of communications technologies, and discloses an internet of vehicles-based dynamic information sending method and device, to constrain a range of sent dynamic information in a high definition map, so as to reduce a transmission amount of the dynamic information in the high definition map and improve transmission efficiency of the dynamic information. The method includes: A first device determines an indication range of dynamic information in a high definition map based on path information of a navigation map. The first device sends first indication information to a second device. The first indication information is used to indicate the dynamic information in the indication range in the high definition map.

35 Claims, 6 Drawing Sheets

(56) References Cited

U.S. PATENT DOCUMENTS

| | | | | |
|---|---|---|---|---|
| 2018/0213376 A1* | 7/2018 | Pinheiro | ............... | H04W 72/30 |
| 2018/0348000 A1* | 12/2018 | Cai | ...................... | G01C 21/367 |
| 2019/0044818 A1 | 2/2019 | Nolan et al. | | |
| 2019/0311614 A1* | 10/2019 | Yang | ...................... | G08G 1/052 |
| 2020/0219388 A1 | 7/2020 | Liu et al. | | |
| 2020/0336375 A1* | 10/2020 | Ucar | .................... | G05D 1/0291 |
| 2021/0152991 A1* | 5/2021 | Wu | ...................... | H04L 1/1864 |

FOREIGN PATENT DOCUMENTS

| | | | |
|---|---|---|---|
| CN | 102941852 | A | 2/2013 |
| CN | 104615453 | A | 5/2015 |
| CN | 105446338 | A | 3/2016 |
| CN | 105644567 | A | 6/2016 |
| CN | 106885578 | A | 6/2017 |
| CN | 109657031 | A | 4/2019 |
| CN | 109774720 | A | 5/2019 |
| KR | 20190029978 | A | 3/2019 |
| KR | 20190032047 | A | 3/2019 |
| WO | 2019052533 | A1 | 3/2019 |

\* cited by examiner

```
                                                        S401
┌──────────────────────────────────────────────────────────┐
│ An internet of vehicles server sends first indication    │
│ information to an internet of vehicles terminal, where   │
│ the first indication information is used to indicate     │
│ dynamic information in a high definition map             │
└──────────────────────────────────────────────────────────┘
                              │
                              ▼                         S402
┌──────────────────────────────────────────────────────────┐
│ The internet of vehicles terminal receives the first     │
│ indication information sent by the internet of vehicles  │
│ server, to maintain and update the dynamic               │
│ information in the high definition map                   │
└──────────────────────────────────────────────────────────┘
```

FIG. 4

| Information type (weather) | Content of corresponding dynamic information (rainstorm weather, expected to last for 4 hours) |
|---|---|

A

| Road identification information (section 3 of Xinxi road) | Content of corresponding dynamic information (road construction and a speed limit of 20 km/h) |
|---|---|

B

| Road identification information (section 3 of Xinxi road) | Information type (construction situation) | Content of corresponding dynamic information (road construction and a speed limit of 20 km/h) |
|---|---|---|

C

| Lane identification information (section 3 of Xinxi road–lane 2) | Content of corresponding dynamic information (slight congestion) |
|---|---|

D

| Lane identification information (section 3 of Xinxi road–lane 2) | Information type (traffic congestion) | Content of corresponding dynamic information (slight congestion) |
|---|---|---|

INTERNET OF VEHICLES BASED DYNAMIC INFORMATION SENDING METHOD AND DEVICE

CROSS-REFERENCE TO RELATED APPLICATIONS

This application is a continuation of International Application No. PCT/CN2020/098291, filed on Jun. 24, 2020, which claims priority to Chinese Patent Application No. 201911209132.4, filed on Nov. 30, 2019. The disclosures of the aforementioned applications are hereby incorporated by reference in their entireties.

TECHNICAL FIELD

This application relates to the field of communications technologies, and in particular, to an internet of vehicles-based dynamic information sending method and device.

BACKGROUND

With the development of society, intelligent vehicles are gradually entering people's daily life. The intelligent vehicle can communicate with another vehicle, a road, a network, and any other connectable facility through low-latency wireless communication, to implement advanced intelligent assisted driving and autonomous driving. In recent years, with the development and improvement of the autonomous driving industry, a high definition map (autonomous driving map) based on in-vehicle communication has become an important enabling technology for advanced intelligent assisted driving and autonomous driving. The high definition map is mandatory for high-level autonomous driving, such as autonomous vehicle driving at L3 or above L3. The high definition map includes a static layer and a dynamic layer. The static layer mainly refers to some target objects that conventionally remain stationary in the high definition map, and may include roads, lanes, intersections, road signs, road auxiliary facilities such as traffic signs and traffic lights. The dynamic layer refers to dynamic information that is changing or may change in an autonomous driving process, that is, dynamically changing event information, such as changing traffic flows, real-time road conditions, and data that needs to be pushed or updated in real time, such as information about road repair or road closure.

Communication of intelligent connected vehicles based on the information about the dynamic layer (namely, the dynamic information) can provide a more accurate basis for vehicle positioning, decision making and planning, and perception convergence, so as to ensure driving safety, comfort, and driving efficiency of higher-level autonomous vehicles.

However, the dynamic information is uncertain. For example, information about a vehicle flow and traffic congestion on a same road section may vary with a time period, and vehicle flow information from 7:00 pm to 9:00 pm may be greatly different from vehicle flow information from 9:00 am to 11:00 am. Therefore, real-time and accurate dynamic information needs to be indicated from two dimensions: time and space. As a result, a data amount of dynamic information sent by an internet of vehicles server to an internet of vehicles terminal is relatively large. When a bandwidth is fixed, a relatively large data amount of to-be-sent dynamic information leads to a relatively long transmission time, thereby affecting transmission efficiency of the dynamic information.

SUMMARY

Embodiments of this application provide an internet of vehicles-based dynamic information sending method and device, to resolve a prior-art problem that transmission efficiency of dynamic information is low.

According to a first aspect, an embodiment of this application provides an internet of vehicles-based dynamic information sending method. In the method, a first device determines an indication range of dynamic information in a high definition map based on path information of a navigation map. Further, the first device sends first indication information to a second device. The first indication information is used to indicate the dynamic information in the indication range in the high definition map.

The method described in this embodiment of this application may be performed by the first device, or may be performed by a component such as a processor chip or a circuit in the first device. In the first aspect, an example in which the first device performs the method is used for description. The first device may be a device such as an internet of vehicles server or a road side unit, or a cloud server such as a map cloud server, and the described second device may be an internet of vehicles terminal (for example, a vehicle, an on-board unit for navigation, advanced intelligent assisted driving, or autonomous driving, or a telematics box).

According to the foregoing method, the first device uses the path information of the navigation map as a constraint for indicating a range of the dynamic information in the high definition map of the second device, determines the indication range of the dynamic information in the high definition map based on the path information of the navigation map, and therefore does not need to send all dynamic information in the high definition map to the second device. This reduces a data amount of sent dynamic information, and improves transmission efficiency of the dynamic information. In addition, the second device travels in an indication range corresponding to navigation information of the navigation map, and the first device constrains the indication range of the dynamic information in the high definition map based on the path information of the navigation map. In this case, travel of the second device in the indication range corresponding to the navigation information is not affected, and transmission efficiency of the dynamic information is improved by reducing the data amount of the dynamic information sent to the second device. It is more conducive to the second device to obtain driving-related dynamic information in time, thereby improving driving safety.

In a possible design, the dynamic information includes at least one of traffic congestion information, traffic accident information, road condition information, passable state information, pedestrian or bicycle road crossing information, and pedestrian or motor vehicle road occupation information. In the foregoing design, real-time changing traffic flow information is sent to the second device, so that the second device can obtain the road condition information. This improves efficiency and safety of autonomous driving and advanced intelligent assisted driving.

In a possible design, the method further includes: Before sending the first indication information to the second device, the first device sends second indication information to the second device. The second indication information is used to indicate that the dynamic information is associated with the path information. Alternatively, that the first device sends the first indication information to the second device includes: sending second indication information and the first indication information to the second device. The second indication information is used to indicate that the dynamic information is associated with the path information. In the foregoing design, when the first indication information indicates the dynamic information in the indication range corresponding to the path information of the navigation map, the second indication information indicates that the dynamic information indicated by the first indication information is associated with the path information of the navigation map. This helps the second device distinguish whether the first indication information indicates global dynamic information in a high definition map system or the dynamic information in the indication range corresponding to the path information of the navigation map.

In a possible design, when the dynamic information is associated with the path information, the first device sends the first indication information to the second device in a first format. The first format is corresponding to that the first device sends the dynamic information in the indication range corresponding to the path information to the second device. When the dynamic information indicated by the first indication information is not associated with the path information of the navigation map, the first device sends the first indication information to the second device in a second format. The first format is different from the second format. In the foregoing design, for whether the dynamic information is associated with the path information, the first device sends the dynamic information in a matching format. This helps the second device distinguish, based on a format of the first indication information, whether the first indication information indicates the global dynamic information in the high definition map system or the dynamic information in the indication range corresponding to the path information of the navigation map.

In a possible design, when the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information. In the foregoing design, the dynamic information is classified based on a content type of the dynamic information, data formats of dynamic information of different content types are standardized, and standardized transmission is performed. This helps improve transmission efficiency of the dynamic information, and facilitates obtaining, by the second device, the content of the dynamic information.

In a possible design, that the first device sends first indication information to a second device includes: When the dynamic information is low-timeliness dynamic information, the first device sends the first indication information to the second device based on a first periodicity; or when the dynamic information is high-timeliness dynamic information, the first device sends the first indication information to the second device when a trigger event corresponding to the dynamic information is triggered. In the foregoing design, for the high-timeliness dynamic information, when a corresponding trigger event is triggered, the first device sends the first indication information to the second device. This helps the second device maintain or update the dynamic information in the high definition map in time, thereby improving driving safety. For the low-timeliness dynamic information, the first device sends the first indication information to the second device based on the first periodicity. This helps save signaling. In addition, the high-timeliness dynamic information is sent when the corresponding trigger event is triggered, and the low-timeliness dynamic information is sent based on the first periodicity. This avoids sending all dynamic information to the second device at the same time, and helps improve transmission reliability of the dynamic information.

In a possible design, when the dynamic information includes at least two pieces of associated information content, the first indication information indicates the at least two pieces of associated information content that are jointly coded. In the foregoing design, joint encoding is performed on associated information content. This is conducive to binding transmission of the dynamic information, and is also conducive to fast updating of the dynamic information in the high definition map of the second device, thereby improving driving security of an autonomous vehicle.

In a possible design, dynamic information in different high definition maps corresponds to different scrambling codes or initialization values. In the foregoing design, in a case in which the high definition map may have a plurality of operators, the first device may scramble the dynamic information by using different scrambling codes or initialization values, and different scrambled or initialized dynamic information corresponds to high definition maps from different map vendors, that is, processing manners or transmission formats of dynamic information corresponding to high definition maps from different map vendors may be different.

According to a second aspect, an embodiment of this application provides an internet of vehicles-based dynamic information sending method. For beneficial effects of the second aspect, refer to the beneficial effects of the first aspect. The method includes: A first device sends first indication information to a second device. The first indication information is used to indicate dynamic information in a high definition map. When the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information.

In a possible design, that a first device sends first indication information to a second device includes:

When the dynamic information is low-timeliness dynamic information, the first device sends the first indication information to the second device based on a first periodicity; or when the dynamic information is high-timeliness dynamic information, the first device sends the first indication information to the second device when a trigger event corresponding to the dynamic information is triggered.

In a possible design, when the dynamic information includes at least two pieces of associated information content, the first indication information indicates the at least two pieces of associated information content that are jointly coded.

In a possible design, dynamic information in different high definition maps corresponds to different scrambling codes or initialization values.

According to a third aspect, an embodiment of this application provides an internet of vehicles-based dynamic information receiving method. For beneficial effects of the third aspect, refer to the beneficial effects of the first aspect. The method includes: A second device receives first indication information sent by a first device. The first indication information is used to indicate dynamic information in an indication range in a high definition map, and the indication range is an indication range that is of the dynamic information in the high definition map and that is determined by the first device based on path information of a navigation map. The second device maintains and updates the dynamic information in the indication range in the high definition map based on the first indication information.

In a possible design, the dynamic information includes at least one of traffic congestion information, traffic accident information, road condition information, passable state information, pedestrian or bicycle road crossing information, and pedestrian or motor vehicle road occupation information.

In a possible design, before the second device receives the first indication information sent by the first device, the method further includes: The second device receives second indication information sent by the first device. The second indication information is used to indicate that the dynamic information is associated with the path information. Alternatively, that the second device receives the first indication information sent by the first device includes: receiving the second indication information and the first indication information that are sent by the first device. The second indication information is used to indicate that the dynamic information is associated with the path information.

In a possible design, that the second device receives the first indication information sent by the first device includes: The second device receives the first indication information sent by the first device in a first format. The first format is corresponding to that the first device sends the dynamic information in the indication range corresponding to the path information.

In a possible design, when the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information.

In a possible design, when the dynamic information includes at least two pieces of associated information content, the first indication information indicates the at least two pieces of associated information content that are jointly coded.

In a possible design, dynamic information in different high definition maps corresponds to different scrambling codes or initialization values.

According to a fourth aspect, an embodiment of this application provides an internet of vehicles-based dynamic information receiving method. For beneficial effects of the fourth aspect, refer to the beneficial effects of the first aspect. The method includes: A second device receives first indication information sent by a first device. The first indication information is used to indicate dynamic information in a high definition map. When the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information. The second device maintains and updates the dynamic information in the high definition map based on the first indication information.

In a possible design, the dynamic information includes at least one of traffic congestion information, traffic accident information, road condition information, passable state information, pedestrian or bicycle road crossing information, and pedestrian or motor vehicle road occupation information.

In a possible design, when the dynamic information includes at least two pieces of associated information content, the first indication information indicates the at least two pieces of associated information content that are jointly coded.

In a possible design, dynamic information in different high definition maps corresponds to different scrambling codes or initialization values.

According to a fifth aspect, an embodiment of this application provides an internet of vehicles apparatus. The apparatus has a function of implementing the method according to any one of the first aspect or the possible designs of the first aspect, or a function of implementing the method according to any one of the second aspect or the possible designs of the second aspect. The function may be implemented by hardware, or may be implemented by hardware executing corresponding software. The hardware or the software includes one or more modules corresponding to the function, for example, a transceiver unit and a processing unit.

In a possible design, the apparatus may be a chip or an integrated circuit.

In a possible design, the apparatus includes a memory and a processor. The memory is configured to store a program executed by the processor. When the program is executed by the processor, the apparatus may perform the method according to any one of the first aspect or the possible designs of the first aspect, or perform the method according to any one of the second aspect or the possible designs of the second aspect.

In a possible design, the apparatus may be an internet of vehicles server or a road side unit.

According to a sixth aspect, an embodiment of this application provides an internet of vehicles apparatus. The apparatus has a function of implementing the method according to any one of the third aspect or the possible designs of the third aspect, or a function of implementing the method according to any one of the fourth aspect or the possible designs of the fourth aspect. The function may be implemented by hardware, or may be implemented by hardware executing corresponding software. The hardware or the software includes one or more modules corresponding to the function, for example, a transceiver unit and a processing unit.

In a possible design, the apparatus may be a chip or an integrated circuit.

In a possible design, the apparatus includes a memory and a processor. The memory is configured to store a program executed by the processor. When the program is executed by the processor, the apparatus may perform the method according to any one of the third aspect or the possible designs of the third aspect, or perform the method according to any one of the fourth aspect or the possible designs of the fourth aspect.

In a possible design, the apparatus may be an internet of vehicles terminal.

According to a sixth aspect, an embodiment of this application provides a computer-readable storage medium. The storage medium stores computer instructions, and when the computer instructions are executed, the method according to any one of the first aspect or the possible designs of the first aspect may be implemented, or the method according to any one of the second aspect or the possible designs of the second aspect may be implemented, or the method according to any one of the third aspect or the possible designs of the third aspect may be implemented, or the method according to any one of the fourth aspect or the possible designs of the fourth aspect may be implemented.

According to a seventh aspect, an embodiment of this application further provides a computer program product, including a computer program or instructions. When the computer program or the instructions is/are executed, the method according to any one of the first aspect or the possible designs of the first aspect may be implemented, or the method according to any one of the second aspect or the possible designs of the second aspect may be implemented, or the method according to any one of the third aspect or the possible designs of the third aspect may be implemented, or the method according to any one of the fourth aspect or the possible designs of the fourth aspect may be implemented.

BRIEF DESCRIPTION OF THE DRAWINGS

FIG. 4 is another schematic diagram of a dynamic information transmission process according to an embodiment of this application;

FIG. 5 is a schematic diagram of a dynamic information transmission format according to an embodiment of this application;

DETAILED DESCRIPTION OF ILLUSTRATIVE EMBODIMENTS

Figure 1:
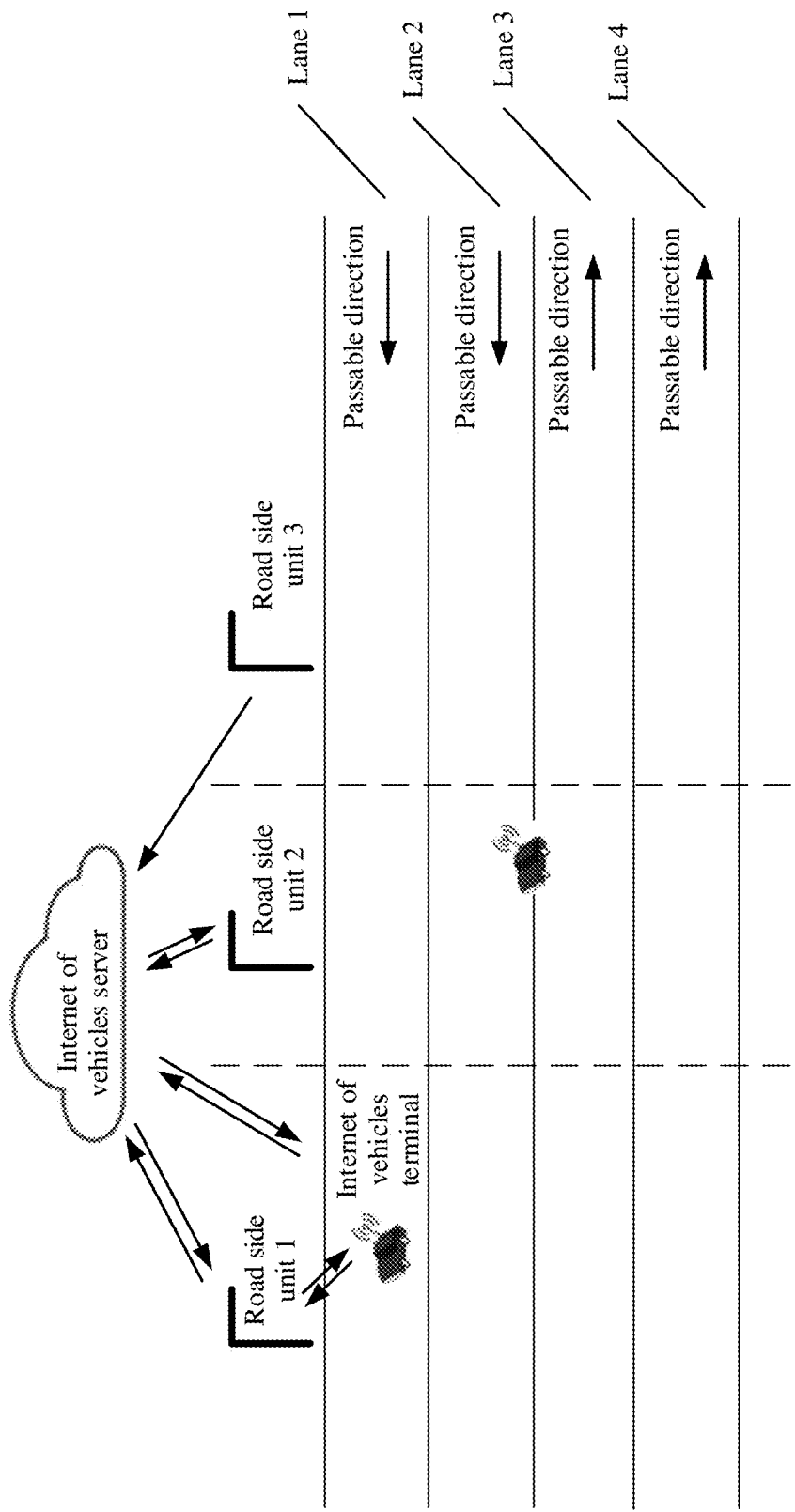
FIG. 1 is a schematic diagram of a network architecture according to an embodiment of this application.

This application provides an internet of vehicles-based dynamic information sending method and device, to constrain a range of dynamic information transmitted by a dynamic layer in a high definition map and optimize a transmission format of the dynamic information, so as to improve transmission efficiency of the dynamic information about the dynamic layer in the high definition map, and resolve a prior-art problem that transmission efficiency is low because all dynamic information of a dynamic layer in a high definition map is transmitted in real time.

Before embodiments of this application are described, some terms in this application are first described, to help a person skilled in the art have a better understanding.

(1) An internet of vehicles terminal may also be referred to as an internet of vehicles communications apparatus or a vehicle-mounted terminal device in this application. The internet of vehicles terminal may be an internet of vehicles terminal of a vehicle or a non-motor vehicle having a communications function, a portable device, a wearable device, a mobile phone (or referred to as a "cellular" phone), a portable, pocket-sized, or handheld terminal, a chip in these devices, or the like. A vehicle is a typical internet of vehicles terminal. In the following embodiments of this application, the vehicle is used as an example for description. The person skilled in the art should understand that an embodiment in which the vehicle is used as an example in this application may be further applied to another type of terminal. The internet of vehicles terminal may specifically execute an internet of vehicles-related service procedure by using an internal function unit or apparatus of the internet of vehicles terminal. For example, when the internet of vehicles terminal is the vehicle, one or more of the following apparatuses in the vehicle may be configured to perform a method procedure related to the internet of vehicles terminal in the embodiments of this application, such as a telematics box (T-Box), a domain controller (DC), a multi-domain controller (MDC), an on board unit (OBU), an internet of vehicles chip, or the like.

(2) A road side unit (RSU) may be configured to send a vehicle to everything (V2X) message to the internet of vehicles terminal in a communications mode such as direct communication (for example, PC5) or a dedicated short-range communications (DSRC) technology. The V2X message may carry dynamic information or other information that needs to be notified to the internet of vehicles terminal. A communications mode between the road side unit and the internet of vehicles terminal may also be referred to as vehicle to infrastructure (V2I) communication. A specific deployment form of the road side unit is not specifically limited in this application. The road side unit may be an internet of vehicles terminal, a mobile or non-mobile terminal device, a server, a chip, or the like. The road side unit may be further configured to report dynamic information that occurs within a jurisdiction to an internet of vehicles server, for example, report the dynamic information by using a road side information (RSI) message.

(3) The internet of vehicles server may be an internet of vehicles platform or server that manages the internet of vehicles terminal and/or the road side unit and provides a service, and includes an application server or a map cloud server that provides a service for a high definition map and a navigation map. A specific deployment form of the internet of vehicles server is not limited in this application, and may be specifically deployed on a cloud, or may be an independent computer device, a chip, or the like. When the V2X message needs to be sent to the internet of vehicles terminal, the internet of vehicles server may send the V2X message to the road side unit, and the road side unit broadcasts the V2X message to an internet of vehicles terminal in a coverage area of the road side unit. Certainly, the internet of vehicles server may directly send the V2X message to the internet of vehicles terminal.

In addition, it should be understood that terms "system" and "network" in the embodiments of this application may be used interchangeably. "At least one" refers to one or more, and "a plurality of" refers to two or more. "And/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including any combination of one item (piece) or a plurality of items (pieces). For example, at least one item (piece) of a, b, or c may represent: a, b, c, a and b, a and c, b and c, or a, b, and c, where a, b, and c may be singular or plural. In addition, unless otherwise stated, in the embodiments of this application, ordinal numbers such as "first" and "second" are used to distinguish between a plurality of objects, and are not intended to limit an order, a time sequence, a priority, or importance of the plurality of objects. For example, a first lane and a second lane are merely intended to distinguish between different lanes, but do not indicate that the two lanes have different priorities, different importance degrees, or the like.

The following describes in detail the embodiments of this application with reference to the accompanying drawings.

FIG. 1 is a network architecture applicable to an embodiment of this application. The network architecture relates to an internet of vehicles server that provides a service for a high definition map and a navigation map, an internet of vehicles terminal configured for navigation, advanced intelligent assisted driving, or autonomous driving, and may further relate to a device such as a road side unit. The internet of vehicles server may be an application server or a map cloud server that provides a service for the high definition map and the navigation map. The internet of vehicles terminal device may be a vehicle, or may be an apparatus such as an on board unit or a telematics box disposed in the vehicle. This is not specifically limited herein. The internet of vehicles server may communicate with the internet of vehicles terminal and a plurality of road side units deployed on a side of a road (the road may include one or more lanes), and each road side unit may also send a V2X message to the internet of vehicles terminal in each coverage area. For ease of understanding, coverage areas of different road side units are separated by dashed lines in FIG. 1. It should be understood that, in actual application, the coverage area of the road side unit may be a regular shape, for example, a rectangle, or may be an irregular shape. The coverage areas of different road side units may partially overlap, or may completely overlap. FIG. 1 in this application is merely a possible example.

In this embodiment of this application, the internet of vehicles server may maintain and update information of the high definition map (HD MAP), to provide a planning and control service for the internet of vehicles terminal, and may further maintain and update information of the navigation map, to provide a navigation service for the internet of vehicles terminal. For example, an internet of vehicles message including dynamic information in the high definition map may be sent to the internet of vehicles terminal through the road side unit. In this application, the dynamic information generally corresponds to a time-varying dynamic event, and is information about the dynamic event. The dynamic event refers to information that may change with time, for example, a construction event, a traffic control event, a traffic accident event, bad weather, or a natural disaster existing on a lane or a road. These dynamic events may be broadcast or sent to the internet of vehicles terminal by using the internet of vehicles message, for example, the V2X (vehicle to X, commonly referred to as V2X) message. For example, when at least one of the construction event, the traffic control event, the traffic accident event, the bad weather, or the natural disaster existing on the lane or the road occurs, information about a corresponding event needs to be sent to the internet of vehicles terminal.

In this embodiment of this application, a range of the dynamic information transmitted by a dynamic layer of the high definition map may be constrained by using path information of the navigation map, to reduce a transmission amount of dynamic information in a to-be-transmitted high definition map, and improve transmission efficiency and utilization of the dynamic information.

Figure 2:
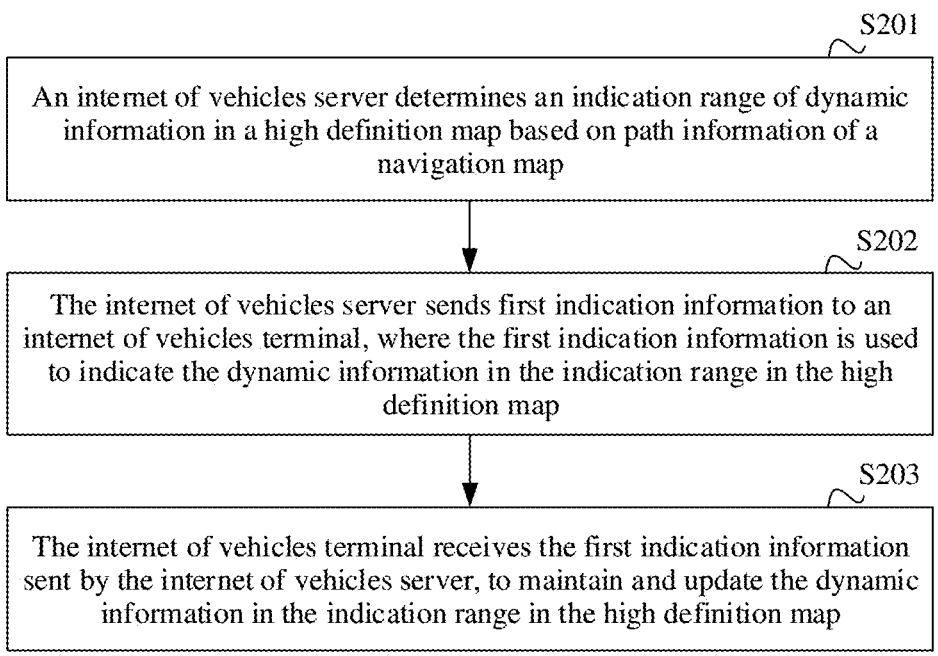
FIG. 2 is a schematic diagram of a dynamic information transmission process according to an embodiment of this application.

FIG. 2 is a schematic diagram of a dynamic information transmission process according to an embodiment of this application. An internet of vehicles server may be implemented as a first device, and an internet of vehicles terminal (for example, a vehicle) may be implemented as a second device. The method includes the following steps.

S201: The internet of vehicles server determines an indication range of dynamic information in a high definition map based on path information of a navigation map.

In this embodiment of this application, the indication range of the dynamic information in the high definition map is corresponding to the path information of the navigation map. In other words, when the internet of vehicles server indicates the dynamic information in the high definition map of the internet of vehicles terminal, the internet of vehicles server may use path information planned by the navigation map for the internet of vehicles terminal as a constraint for indicating a range of the dynamic information in the high definition map of the internet of vehicles terminal. This reduces a transmission amount of the dynamic information, and improves transmission efficiency of the dynamic information. The path information of the navigation map such as the path information planned by the navigation map for the internet of vehicles terminal (vehicle) may include information about one or more driving road sections planned for the internet of vehicles terminal and a lane occupied by the internet of vehicles terminal on each driving road section.

For obtaining of the path information planned by the navigation map for the internet of vehicles terminal, in a possible implementation, when the internet of vehicles server serves as an application server or a map cloud server for both the high definition map and the navigation map of the internet of vehicles terminal, the internet of vehicles server may plan the path information for the internet of vehicles terminal based on the navigation map. For example, the internet of vehicles terminal reports a current location and a destination to the internet of vehicles server, and the internet of vehicles server plans one or more paths for the internet of vehicles terminal in the navigation map based on the location "location A" and the destination "location B" of the internet of vehicles terminal, and sends the one or more paths planned for the internet of vehicles terminal in the navigation map to the internet of vehicles terminal. Optionally, when the internet of vehicles server plans only one path in the navigation map for the internet of vehicles terminal, the path planned by the internet of vehicles server for the internet of vehicles terminal in the navigation map is path information planned by the internet of vehicles server for the internet of vehicles terminal in the navigation map. When the internet of vehicles server plans a plurality of paths in the navigation map for the internet of vehicles terminal, the internet of vehicles server may determine that a path that is selected by a user in the navigation map by using the internet of vehicles terminal is path information of the internet of vehicles terminal.

In another possible implementation, when the internet of vehicles server is not used as an application server or a map cloud server that provides a service for the navigation map of the internet of vehicles terminal, before the internet of vehicles server sends, to the internet of vehicles terminal, indication information indicating the dynamic information in the high definition map, the internet of vehicles server may deliver a path information obtaining instruction to the internet of vehicles terminal, to indicate the internet of vehicles terminal to report, to the internet of vehicles server, the path information planned by the navigation map for the internet of vehicles terminal. Certainly, when running the high definition map, the internet of vehicles terminal may also report, to the internet of vehicles server, the path information planned by the navigation map for the internet of vehicles terminal. In addition, it may be understood that, when the internet of vehicles server is not used as an application server or a map cloud server that serves the navigation map of the internet of vehicles terminal, the internet of vehicles server may alternatively use the application server or the map cloud server that serves the navigation map of the internet of vehicles terminal to obtain the path information planned by the navigation map for the internet of vehicles terminal.

Figure 3:
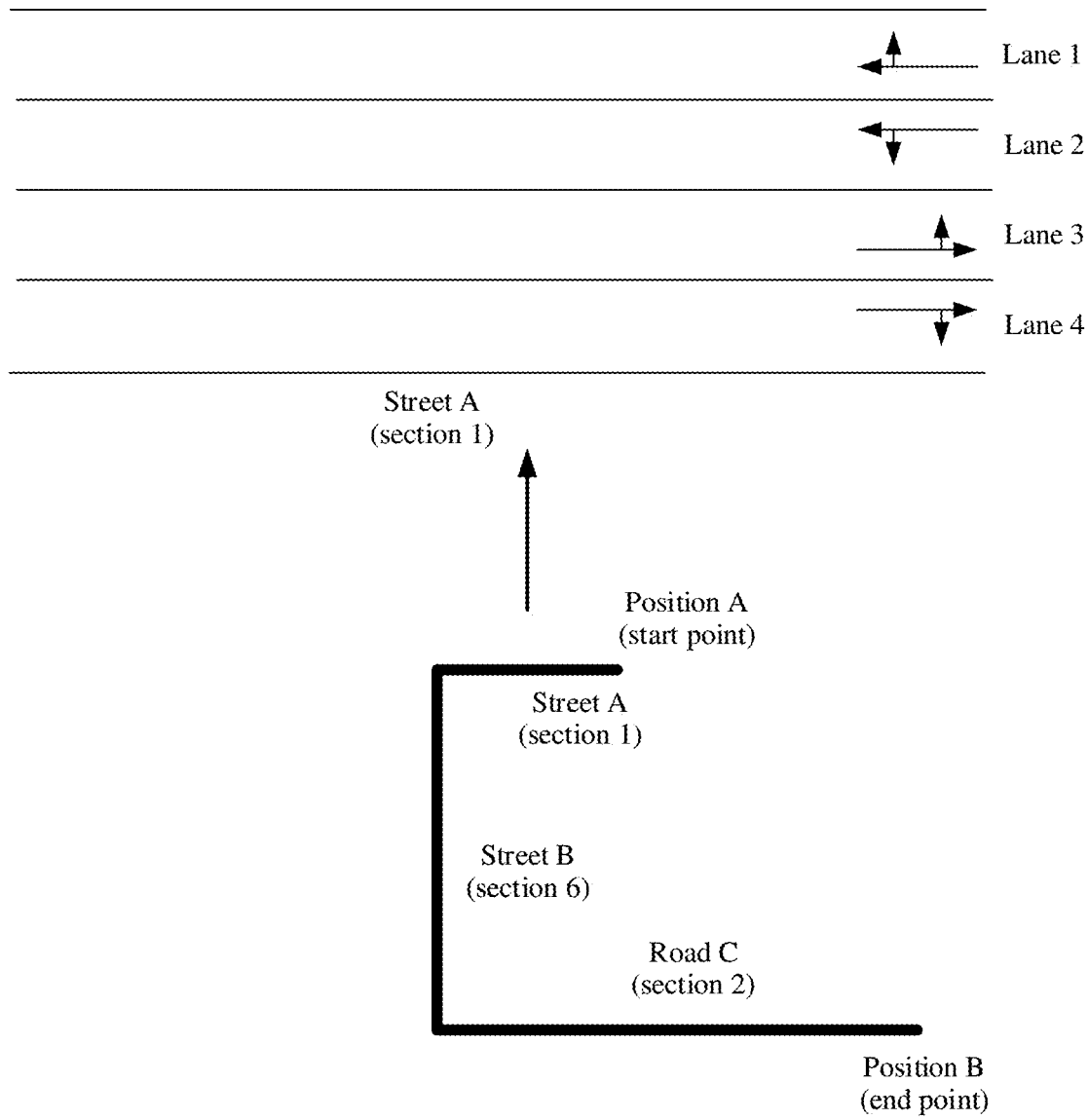
FIG. 3 is a schematic diagram of navigation information of a navigation map according to an embodiment of this application.

After obtaining the path information planned by the navigation map for the internet of vehicles terminal, for determining the indication range of the dynamic information, the internet of vehicles server may use one or more driving road sections planned by the navigation map for the internet of vehicles terminal as the indication range of the dynamic information in the high definition map. For example, referring to FIG. 3, the path information planned by the navigation map for the internet of vehicles terminal is: Street A (section 1)-Street B (section 6)-Road C (section 2). The internet of vehicles server may determine that the indication range of the dynamic information in the high definition map is: Street A (section 1)-Street B (section 6)-Road C (section 2).

Optionally, the internet of vehicles server may further constrain (limit) the indication range of the dynamic information in the high definition map based on information that is about a lane occupied on each driving road section and that is planned by the navigation map for the internet of vehicles terminal. Still using FIG. 3 as an example, on Street A (section 1), the internet of vehicles terminal needs to turn left into Street B (section 6), and the navigation map indicates that the internet of vehicles terminal is planned to occupy a lane 2 (a left-turn lane) on Street A (section 1). In this case, the internet of vehicles server may determine that the indication range of the dynamic information in the high definition map on Street A (section 1) is the lane 2. The internet of vehicles server may determine, based on the information that is about the lane occupied on each driving road section and that is planned by the navigation map for the internet of vehicles terminal, that the indication range of the dynamic information in the high definition map is: the lane 2 of Street A (section 1), a lane 1 of Street B (section 6), and a lane 3 of Road C (section 2), further narrowing the indication range of the dynamic information in the high definition map. Therefore, when the internet of vehicles server indicates the dynamic information such as a construction event, a traffic control event, a traffic accident event, bad weather, or a natural disaster, only corresponding dynamic information on the lane 2 of Street A (section 1), the lane 1 of Street B (section 6), and the lane 3 of Road C (section 2) needs to be indicated.

In another possible implementation, the internet of vehicles server may further determine, based on the path information of the navigation map of the internet of vehicles terminal and the current location of the internet of vehicles terminal, a driving road section in which the internet of vehicles terminal is currently located as the indication range of the dynamic information in the high definition map. For example, if the driving road section in which the internet of vehicles terminal is currently located is Street A (section 1), the internet of vehicles server may use the lane 2 of Street A (section 1) as the indication range of the dynamic information in the high definition map.

It should be understood that as the internet of vehicles terminal moves, the path information of the navigation map of the internet of vehicles terminal is updated. For example, when the destination remains unchanged, a path from the internet of vehicles terminal to the destination changes as the internet of vehicles terminal moves, and the indication range that is of the dynamic information in the high definition map and that is determined by the internet of vehicles server is updated based on the updated path information of the navigation map.

S202: The internet of vehicles server sends first indication information to the internet of vehicles terminal, where the first indication information is used to indicate the dynamic information in the indication range in the high definition map.

In this embodiment of this application, the dynamic information may include at least one of the following information: traffic congestion information, traffic accident information, road condition information, passable state information, pedestrian or bicycle road crossing information, and pedestrian or motor vehicle road occupation information of a lane; traffic congestion information, traffic accident information, road condition information, passable state information, pedestrian or bicycle road crossing information, and pedestrian or motor vehicle road occupation information of a road section; weather information; or the like.

For example, the first indication information indicates that a road condition of the lane 2 of Street A (section 1) is wet and slippery.

S203: The internet of vehicles terminal receives the first indication information sent by the internet of vehicles server, to maintain and update the dynamic information in the indication range in the high definition map.

In this embodiment of this application, the internet of vehicles server may send the first indication information to the road side unit (for example, a road side unit covering the current location of the internet of vehicles terminal), and the road side unit forwards the first indication information to the internet of vehicles terminal, for example, sends the first indication information to the internet of vehicles terminal through low-latency wireless communication. Alternatively, the internet of vehicles server may directly send the first indication information to the internet of vehicles terminal. This is not specifically limited herein.

After receiving the first indication information, the internet of vehicles terminal updates the dynamic information in the corresponding indication range based on an indication range of the first indication information, and may adjust a decision of autonomous driving or a decision of an optimal driving route of assisted driving based on the updated dynamic information. For example, the first indication information indicates that the road condition of the lane 2 of Street A (section 1) is wet and slippery, and the internet of vehicles terminal updates that the road condition of the lane 2 of Street A (section 1) is wet and slippery to the high definition map, and control a driving speed on the lane 2 of Street A (section 1) below 30 km/h matching the wet and slippery road.

In addition, to ensure that the internet of vehicles server and the internet of vehicles terminal have consistent understanding of whether the indication range of the first indication information is a global absolute range of a system or a relative range associated with the path information of the navigation map, in a possible implementation, the internet of vehicles terminal may combine the received first indication information sent by the internet of vehicles server with the navigation map by default, that is, the dynamic information indicated by the first indication information is associated with the path information of the navigation map. In another possible implementation, when the range of the dynamic information in the high definition map indicated by the first indication information is determined based on the path information of the navigation map, before the internet of vehicles server sends the first indication information to the internet of vehicles terminal, or when the internet of vehicles server sends the first indication information to the internet of vehicles terminal, the internet of vehicles server sends second indication information to the internet of vehicles terminal. The second indication information is used to indicate that the dynamic information is associated with the path information, that is, indicate that the dynamic information is relative information in the indication range determined based on the path information.

To help the internet of vehicles terminal distinguish whether the first indication information indicates global dynamic information in a high definition map system or the dynamic information in the indication range corresponding to the path information of the navigation map, when the dynamic information indicated by the first indication information is associated with the path information of the navigation map, the internet of vehicles server may further send the first indication information to the internet of vehicles terminal in a first format; or when the dynamic information indicated by the first indication information is not associated with the path information of the navigation map, the internet of vehicles server may further send the first indication information to the internet of vehicles terminal in a second format. The first format is corresponding to that the internet of vehicles server sends the dynamic information in the indication range corresponding to the path information to the internet of vehicles terminal. The second format is corresponding to that the dynamic information sent by the internet of vehicles server to the internet of vehicles terminal is not associated with the path information of the navigation map. The first format is different from the second format. For example, for dynamic information "rainstorm, expected to last for four hours" sent globally by the system, the internet of vehicles server may broadcast, by using one or more road side units in a broadcast format, the first indication information to all internet of vehicles terminals within coverage of the one or more road side units. For dynamic information "the road condition of the lane 2 of Street A (section 1) is wet and slippery" in a relative range associated with the path information of the navigation map of an internet of vehicles terminal, the internet of vehicles server sends, in a unicast format, the first indication information to the internet of vehicles terminal directly or by using a road side unit covering the internet of vehicles terminal. In another example, when the dynamic information is not associated with the path information of the navigation map, the internet of vehicles server indicates, in the second format, information "road conditions of all four lanes of Street A (section 1) are wet and slippery", that is, wet and slippery road information of each lane needs to be notified separately.

In this embodiment of this application, a transmission format of the dynamic information may be further optimized, to improve transmission efficiency of the dynamic information of a dynamic layer in the high definition map. For content the same as that in the foregoing embodiment, reference may be made to the description of the foregoing embodiment, and details are not described in this embodiment.

FIG. 4 is a schematic diagram of a dynamic information transmission process according to an embodiment of this application. An internet of vehicles server may be implemented as a first device, and an internet of vehicles terminal (for example, a vehicle) may be implemented as a second device. The method includes the following steps.

S401: The internet of vehicles server sends first indication information to the internet of vehicles terminal, where the first indication information is used to indicate dynamic information in a high definition map.

When the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information.

S402: The internet of vehicles terminal receives the first indication information sent by the internet of vehicles server, to maintain and update the dynamic information in the high definition map.

In this embodiment of this application, the dynamic information may be classified into general dynamic information, road-level dynamic information, and lane-level dynamic information based on coverage of content of the dynamic information.

The general dynamic information may also be referred to as global-level dynamic information, and generally covers a road section or a plurality of road sections. For example, a weather condition (rainy, snowy, foggy, and the like) is information that is of all road sections in a larger range and that is the same at a same moment.

The road-level dynamic information generally covers a road section, for example, traffic control information, road construction information, pedestrian or bicycle road crossing information, and road occupation information of the road.

The lane-level dynamic information generally covers a lane, for example, traffic congestion information, traffic accident information, road condition information, manhole cover lifting and falling information, lane occupation information, and reversible lane information of the lane.

Different transmission formats may be designed for dynamic information with different coverage. Optionally, when the dynamic information is the general dynamic information, as shown in (A) in FIG. 5, the first indication information includes an information type, for example, weather, and content of the dynamic information corresponding to the information type, for example, rainstorm weather, expected to last for four hours.

When the dynamic information is the road-level dynamic information, as shown in (B) in FIG. 5, the first indication information includes road identification information, for example, a section 3 of Xinxi road and content of dynamic information corresponding to the road identification information, for example, road construction and a speed limit of 20 km/h. As shown in (C) in FIG. 5, the first indication information may further include an information type in the road identification information, for example, a construction situation.

When the dynamic information is the lane-level dynamic information, as shown in (D) in FIG. 5, the first indication information includes lane identification information, for example, a section 3 of Xinxi road-a lane 2 and content of dynamic information corresponding to the lane identification information, for example, slight congestion. As shown in (E) in FIG. 5, the first indication information may further include an information type in the lane identification information, for example, traffic congestion.

The dynamic information is classified based on the coverage of the content of the dynamic information, data formats of dynamic information of different content types are standardized, and standardized transmission is performed. This helps improve transmission efficiency of the dynamic information, and facilitates obtaining, by the internet of vehicles terminal, the content of the dynamic information.

In a possible implementation, to further improve transmission reliability of the dynamic information, the internet of vehicles server may further send, to the internet of vehicles terminal based on timeliness of the dynamic information, the first indication information used to indicate the dynamic information in the high definition map.

Specifically, a priority may be set for a dynamic event corresponding to each piece of dynamic information, and the priority of the dynamic event may be used to indicate whether the dynamic event is a high-timeliness dynamic event (or referred to as an emergency event) or a low-timeliness dynamic event (or referred to as a non-emergency event), so as to indicate a priority of the dynamic information corresponding to the dynamic event. For example, an event whose priority reaches (or exceeds) a threshold is a low-timeliness dynamic event, and an event whose priority is lower than (or not higher than) the threshold is a low-timeliness dynamic event. High-priority dynamic events may include relative emergency events such as traffic accident information, road condition information, passable state information (for example, corresponding traffic lights information), pedestrian or bicycle road crossing information, and pedestrian or motor vehicle road occupation information. Low-priority dynamic events may include non-emergency events that can be predicted in advance, such as weather and a traffic control event.

When the internet of vehicles server sends the first indication information to the internet of vehicles terminal, if the dynamic event corresponding to the dynamic information in the high definition map indicated by the first indication information does not reach (or does not exceed) a threshold, and it is determined that the dynamic information is low-timeliness dynamic information, the internet of vehicles server may broadcast to the internet of vehicles terminal based on a first periodicity. The first periodicity is configurable, or may be preconfigured in the internet of vehicles server. For example, the internet of vehicles server broadcasts road passable state information to the internet of vehicles terminal every 20 minutes, or broadcasts weather information to the internet of vehicles terminal every 1 hour.

If a priority of the dynamic event corresponding to the dynamic information in the high definition map indicated by the first indication information reaches (or exceeds) a threshold, and it is determined that the dynamic information is high-timeliness dynamic information, the internet of vehicles server sends the first indication information to the internet of vehicles terminal based on a trigger event corresponding to the dynamic information when the trigger event is triggered. For example, when a navigation map indicates that a road is switched, the lane-level dynamic information is triggered to be updated and a corresponding indication is performed. That is, a trigger condition of the lane-level dynamic information includes lane or road switching. For example, if a speed of the internet of vehicles terminal is continuously less than or equal to a threshold within a time period, the internet of vehicles terminal may have a requirement to change a lane or a road. Therefore, the internet of vehicles server may trigger the road-level or lane-level dynamic information to the internet of vehicles terminal based on a lane change or road switching status of the internet of vehicles terminal. It should be understood that, in this embodiment of this application, the described priority of the dynamic event and the trigger event of the dynamic information corresponding to the dynamic event may be preconfigured, or may be adjusted based on a requirement.

In addition, because different high definition map operators may use different high definition map data formats, dynamic information sent by the internet of vehicles server to internet of vehicles terminals that use high definition maps from different operators may use different data formats. For example, four traffic lights at an intersection may be numbered in different manners in different high definition maps. For example, in a high definition map from a map vendor 1, the four traffic lights are numbered 1, 2, 3, and 4, in a high definition map from a map vendor 2, the four traffic lights are numbered 4, 3, 2, and 1, and in a high definition map from a map vendor 3, the four traffic lights are numbered 2, 3, 1, and 4. Therefore, traffic lights information sent to different map vendor should use an information format corresponding to the map vendor. To help the internet of vehicles terminal identify different information formats, different scrambling codes or initialization values are used to scramble dynamic information in high definition maps sent to different high definition map operators.

In addition, when the internet of vehicles server indicates the dynamic information, an association (binding) relationship between different dynamic information may be further considered. For example, there is an association relationship between weather information and road-level road condition information. When the weather information is rainy, snowy, or the like, the weather information of rainy, snowy, or the like is associated with an indication of the road-level road condition information, such as wet and slippery information and ponding information, to perform a joint coding indication. When the weather information is sunny, the wet and slippery information, the ponding information, and the like may not be indicated. That is, a dependency relationship between to-be-indicated information is established. For example, an indication of the wet and slippery road information depends on an indication of the weather information. A Joint indication of the weather information and the road condition information can improve the transmission efficiency of the dynamic information.

In another example, when an indication of the road-level dynamic information is wet, slippery, and ponding road information, and an indication of lane-level passable state information and the like is associated, the two types of dynamic information are jointly coded.

The foregoing mainly describes the solutions provided in this application from a perspective of interaction between the internet of vehicles server (the first device) and the internet of vehicles terminal (the second device). It may be understood that to implement the foregoing functions, each network element includes a corresponding hardware structure and/or software module (or unit) for implementing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
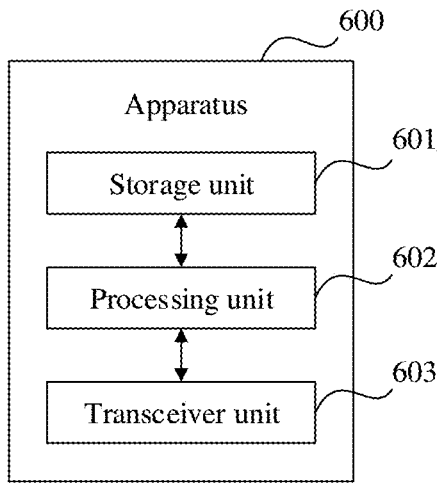
FIG. 6 is a schematic block diagram of an internet of vehicles apparatus according to an embodiment of this application.

When an integrated unit (module) is used, FIG. 6 is a possible example block diagram of an internet of vehicles apparatus according to an embodiment of this application. The internet of vehicles apparatus 600 may exist in a form of software. The apparatus 600 may include a processing unit 602 and a transceiver unit 603.

In a possible design, the processing unit 602 is configured to implement a corresponding processing function. The transceiver unit 603 is configured to support communication between the apparatus 600 and another network entity. Optionally, the transceiver unit 603 may include a receiving unit and/or a sending unit, respectively configured to perform a receiving operation and a sending operation. Optionally, the apparatus 600 may further include a storage unit 601, configured to store program code and/or data of the apparatus 600.

The apparatus 600 may be the internet of vehicles server in any one of the foregoing embodiments (for example, the internet of vehicles server is the internet of vehicles server in Embodiment 1), or may be a component such as a chip disposed in the internet of vehicles server. The processing unit 602 may support the apparatus 600 in performing an action of the internet of vehicles server in the foregoing method examples. Alternatively, the processing unit 602 mainly performs an internal action of the internet of vehicles server in the method examples, and the transceiver unit 603 may support communication between the apparatus 600 and the internet of vehicles terminal.

Specifically, in an embodiment, the processing unit 602 is configured to determine an indication range of dynamic information in a high definition map based on path information of a navigation map.

The transceiver unit 603 is configured to send first indication information to the internet of vehicles terminal. The first indication information is used to indicate the dynamic information in the indication range in the high definition map.

In a possible design, the dynamic information includes at least one of traffic congestion information, traffic accident information, road condition information, passable state information, pedestrian or bicycle road crossing information, and pedestrian or motor vehicle road occupation information.

In a possible design, the transceiver unit 603 is further configured to: before sending the first indication information to the internet of vehicles terminal, send second indication information to the internet of vehicles terminal. The second indication information is used to indicate that the dynamic information is associated with the path information.

In a possible design, when sending the first indication information to the internet of vehicles terminal, the transceiver unit 603 is specifically configured to send second indication information and the first indication information to the internet of vehicles terminal. The second indication information is used to indicate that the dynamic information is associated with the path information.

In a possible design, when the dynamic information is associated with the path information, the transceiver unit 603 sends the first indication information to the internet of vehicles terminal in a first format. The first format is corresponding to sending the dynamic information in the indication range corresponding to the path information to the internet of vehicles terminal.

In a possible design, when the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information.

In a possible design, the transceiver unit 603 is specifically configured to: when the dynamic information is low-timeliness dynamic information, send the first indication information to the internet of vehicles terminal based on a first periodicity; or when the dynamic information is high-timeliness dynamic information, send the first indication information to the internet of vehicles terminal when a trigger event corresponding to the dynamic information is triggered.

In a possible design, when the dynamic information includes at least two pieces of associated information content, the first indication information indicates the at least two pieces of associated information content that are jointly coded.

In a possible design, dynamic information in different high definition maps corresponds to different scrambling codes or initialization values.

In another embodiment, the processing unit 602 is configured to determine to send first indication information to an internet of vehicles terminal. The first indication information is used to indicate dynamic information in a high definition map. When the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information.

The transceiver unit 603 is configured to send the first indication information to the internet of vehicles terminal.

In a possible design, the transceiver unit 603 is specifically configured to: when the dynamic information is low-timeliness dynamic information, send the first indication information to the internet of vehicles terminal based on a first periodicity; or when the dynamic information is high-timeliness dynamic information, send the first indication information to the internet of vehicles terminal when a trigger event corresponding to the dynamic information is triggered.

In a possible design, when the dynamic information includes at least two pieces of associated information content, the first indication information indicates the at least two pieces of associated information content that are jointly coded.

In a possible design, dynamic information in different high definition maps corresponds to different scrambling codes or initialization values.

Figure 7:
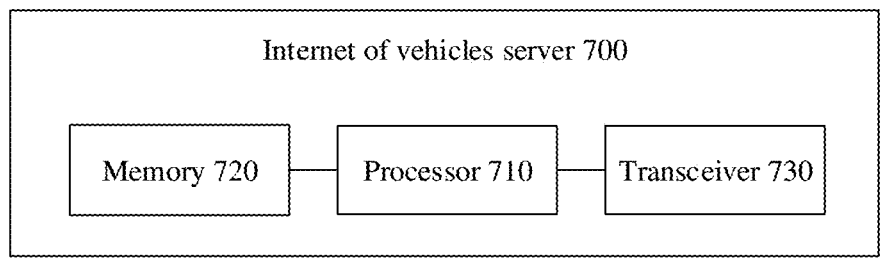
FIG. 7 is a schematic block diagram of an internet of vehicles server according to an embodiment of this application.

As shown in FIG. 7, an embodiment of this application further provides an internet of vehicles server 700. The internet of vehicles server 700 includes a processor 710, a memory 720, and a transceiver 730.

In a possible design, the memory 720 stores instructions, a program, or data, and the memory 720 may be configured to implement a function of the storage unit 601 in the foregoing embodiment. The processor 710 is configured to read the instructions, program, or data stored in the memory 720. When the instructions or program stored in the memory 720 are/is executed, the processor 710 is configured to perform an operation performed by the processing unit 602 in the foregoing embodiment, and the transceiver 730 is configured to perform an operation performed by the transceiver unit 603 in the foregoing embodiment.

It should be understood that the internet of vehicles apparatus 600 or the internet of vehicles server 700 in this embodiment of this application may be corresponding to the internet of vehicles server in the dynamic information transmission method (FIG. 2 or FIG. 4) in the embodiments of this application. In addition, operations and/or functions of modules in the internet of vehicles apparatus 600 or the internet of vehicles server 700 are separately intended to implement corresponding procedures of the methods in FIG. 2 or FIG. 4. For brevity, details are not described herein again.

Figure 8:
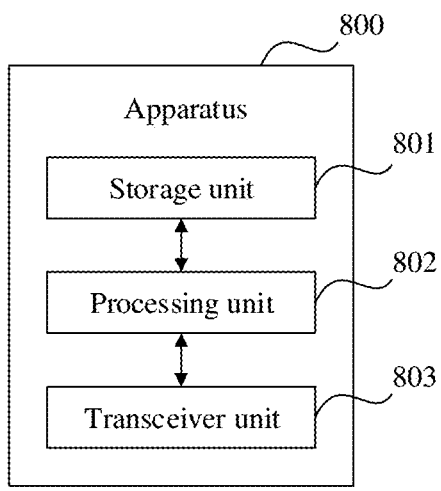
FIG. 8 is another schematic block diagram of an internet of vehicles apparatus according to an embodiment of this application.

When an integrated unit (module) is used, FIG. 8 is a possible example block diagram of an internet of vehicles apparatus according to an embodiment of this application. The apparatus 800 may exist in a form of software. The apparatus 800 may include a processing unit 802 and a transceiver unit 803.

In a possible design, the processing unit 802 is configured to implement a corresponding processing function. The transceiver unit 803 is configured to support communication between the apparatus 800 and another network entity. Optionally, the transceiver unit 803 may include a receiving unit and/or a sending unit, respectively configured to perform a receiving operation and a sending operation. Optionally, the apparatus 800 may further include a storage unit 801, configured to store program code and/or data of the apparatus 800.

The apparatus 800 may be the internet of vehicles terminal in any one of the foregoing embodiments, or may be a component such as a chip disposed in the internet of vehicles terminal. The processing unit 802 may support the apparatus 800 in performing an action of the internet of vehicles terminal in the foregoing method examples. Alternatively, the processing unit 802 mainly performs an internal action of the internet of vehicles terminal in the method examples, and the transceiver unit 803 may support communication between the apparatus 800 and the internet of vehicles server.

Specifically, in a possible embodiment, the transceiver unit 803 is configured to receive first indication information sent by the internet of vehicles server. The first indication information is used to indicate dynamic information in an indication range in a high definition map, and the indication range is an indication range that is of the dynamic information in the high definition map and that is determined by the internet of vehicles server based on path information of a navigation map.

The processing unit 802 is configured to maintain and update the dynamic information in the indication range in the high definition map based on the first indication information.

In a possible design, the dynamic information includes at least one of traffic congestion information, traffic accident information, road condition information, passable state information, pedestrian or bicycle road crossing information, and pedestrian or motor vehicle road occupation information.

In a possible design, the transceiver unit 803 is further configured to: before receiving the first indication information sent by the internet of vehicles server, receive second indication information sent by the internet of vehicles server. The second indication information is used to indicate that the dynamic information is associated with the path information.

In a possible design, when receiving the first indication information sent by the internet of vehicles server, the transceiver unit 803 is specifically configured to receive second indication information and the first indication information that are sent by the internet of vehicles server. The second indication information is used to indicate that the dynamic information is associated with the path information.

In a possible design, when receiving the first indication information sent by the internet of vehicles server, the transceiver unit 803 is specifically configured to receive the first indication information sent by the internet of vehicles server in a first format. The first format is corresponding to that the internet of vehicles server sends the dynamic information in the indication range corresponding to the path information.

In a possible design, when the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information.

In a possible design, when the dynamic information includes at least two pieces of associated information content, the first indication information indicates the at least two pieces of associated information content that are jointly coded.

In a possible design, dynamic information in different high definition maps corresponds to different scrambling codes or initialization values.

In another embodiment, the transceiver unit 803 is configured to receive first indication information sent by an internet of vehicles terminal. The first indication information is used to indicate dynamic information in a high definition map. When the dynamic information is road-level dynamic information, the first indication information includes road identification information and content of dynamic information corresponding to the road identification information. When the dynamic information is lane-level dynamic information, the first indication information includes lane identification information and content of dynamic information corresponding to the lane identification information. The lane identification information includes road information and lane information.

The processing unit 802 is configured to maintain and update the dynamic information in the high definition map based on the first indication information.

In a possible design, when the dynamic information includes at least two pieces of associated information content, the first indication information indicates the at least two pieces of associated information content that are jointly coded.

In a possible design, dynamic information in different high definition maps corresponds to different scrambling codes or initialization values.

Figure 9:
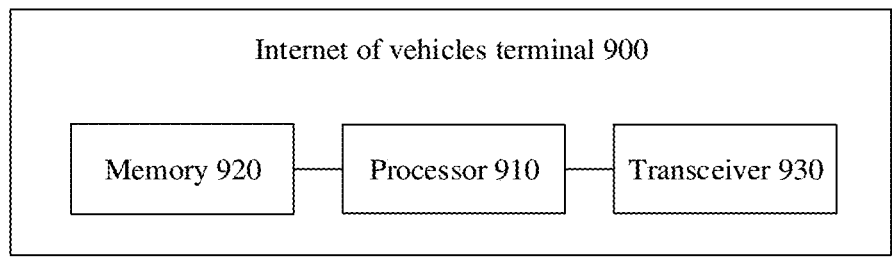
FIG. 9 is a schematic block diagram of an internet of vehicles terminal according to an embodiment of this application.

As shown in FIG. 9, an embodiment of this application further provides an internet of vehicles terminal goo. The internet of vehicles terminal goo includes a processor 910, a memory 920, and a transceiver 930.

In a possible design, the memory 920 stores instructions, a program, or data, and the memory 920 may be configured to implement a function of the storage unit 801 in the foregoing embodiment. The processor 910 is configured to read the instruction, program, or data stored in the memory 920. When the instructions or program stored in the memory 920 are/is executed, the processor 910 is configured to perform an operation performed by the processing unit 802 in the foregoing embodiment, and the transceiver 930 is configured to perform an operation performed by the transceiver unit 803 in the foregoing embodiment.

It should be understood that the internet of vehicles apparatus 800 or the internet of vehicles terminal goo in this embodiment of this application may be corresponding to the internet of vehicles terminal in the dynamic information transmission method (FIG. 2 or FIG. 4) in the embodiments of this application. In addition, operations and/or functions of modules in the internet of vehicles apparatus 800 or the internet of vehicles terminal goo are separately intended to implement corresponding procedures of the methods in FIG. 2 or FIG. 4. For brevity, details are not described herein again.

An embodiment of this application further provides an internet of vehicles apparatus. The internet of vehicles apparatus may be an internet of vehicles terminal or a circuit. The internet of vehicles apparatus may be configured to perform an action performed by the internet of vehicles terminal in the foregoing method embodiments.

Figure 10:
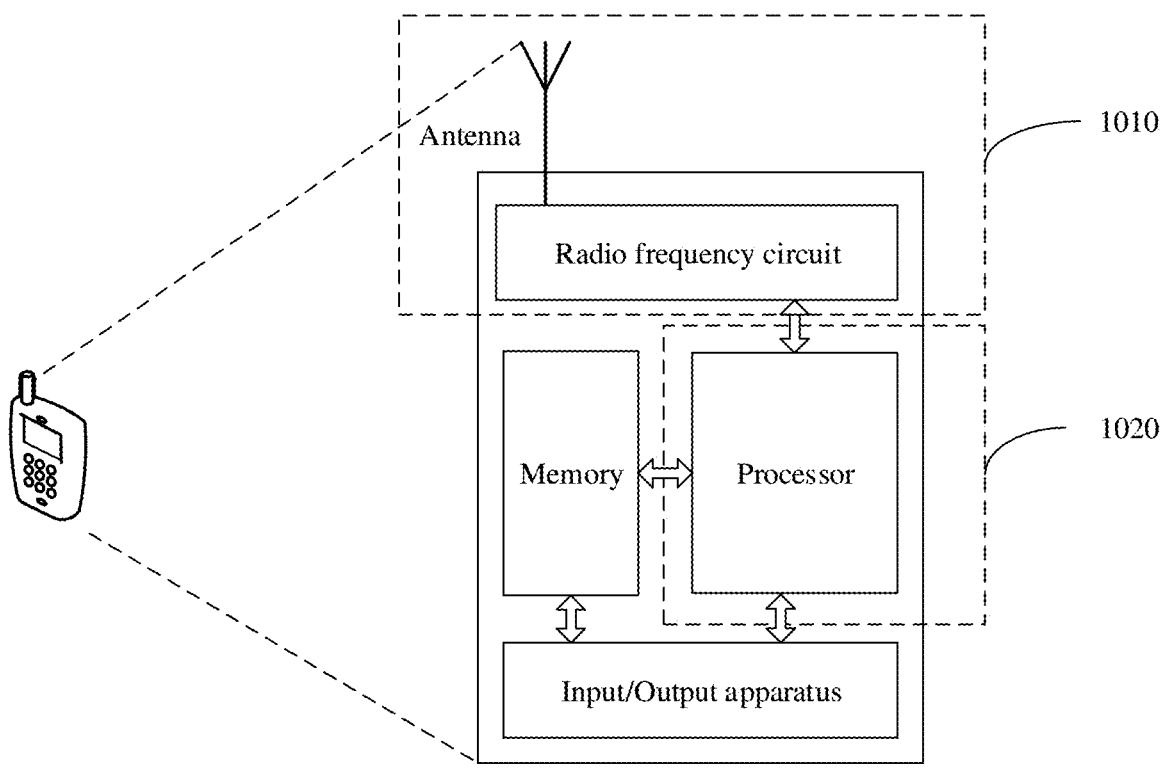
FIG. 10 is a schematic structural diagram of an internet of vehicles terminal according to an embodiment of this application.

When the internet of vehicles apparatus is the internet of vehicles terminal, FIG. 10 is a schematic structural diagram of a simplified internet of vehicles terminal. For ease of understanding and illustration, in FIG. 10, a mobile phone is used as an example of the internet of vehicles terminal. As shown in FIG. 10, the internet of vehicles terminal includes a processor, a memory, a radio frequency circuit, an antenna, and an input/output apparatus. The processor is mainly configured to: process a communications protocol and communications data, and control the internet of vehicles terminal to execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user, and output data to the user. It should be noted that some types of internet of vehicles terminals may not have the input/output apparatus.

When data needs to be sent, after performing baseband processing on the to-be-sent data, the processor outputs the baseband signal to the radio frequency circuit; and the radio frequency circuit performs radio frequency processing on the baseband signal and then sends the radio frequency signal to outside in the form of the electromagnetic wave through the antenna. When data is sent to the internet of vehicles terminal, the radio frequency circuit receives the radio frequency signal through the antenna, converts the radio frequency signal into the baseband signal, and outputs the baseband signal to the processor. The processor converts the baseband signal into data, and processes the data. For ease of description, FIG. 10 shows only one memory and one processor. In an actual internet of vehicles terminal product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna and the radio frequency circuit that have a transceiver function may be considered as a transceiver unit (or a communications unit) of the internet of vehicles terminal, and the processor having a processing function may be considered as a processing unit of the internet of vehicles terminal. As shown in FIG. 10, the internet of vehicles terminal includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 1010 may be considered as a receiving unit, and a component for implementing a sending function in the transceiver unit 1010 may be considered as a sending unit. In other words, the transceiver unit 1010 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

It should be understood that the transceiver unit 1010 is configured to perform the sending operation and the receiving operation on an internet of vehicles terminal side in the foregoing method embodiments, and the processing unit 1020 is configured to perform an operation other than the receiving/sending operation of the internet of vehicles terminal in the foregoing method embodiments.

For example, in an implementation, the transceiver unit 1010 is configured to perform the sending and receiving operation on the internet of vehicles terminal side in S203 in FIG. 2, and/or the transceiver unit 1010 is further configured to perform another receiving and sending step on the internet of vehicles terminal side in this embodiment of this application. The processing unit 1020 is configured to perform the processing operation on the internet of vehicles terminal side in S203 in FIG. 2, and/or the processing unit 1020 is further configured to perform another processing step on the internet of vehicles terminal side in this embodiment of this application.

When the internet of vehicles apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

In another form of this embodiment, a computer-readable storage medium is provided. The computer-readable storage medium stores instructions. When the instructions are executed, the method on the internet of vehicles terminal side in the foregoing method embodiments may be performed.

In another form of this embodiment, a computer program product including instructions is provided. When the instructions are executed, the method on the internet of vehicles terminal side in the foregoing method embodiments may be performed.

In another form of this embodiment, a chip is provided. The chip is coupled to a memory, and is configured to read and execute instructions stored in the memory. When the instructions are executed, the method on the internet of vehicles terminal side in the foregoing method embodiments may be performed.

In another form of this embodiment, a computer-readable storage medium is provided. The computer-readable storage medium stores instructions. When the instructions are executed, the method on the internet of vehicles server side in the foregoing method embodiments may be performed.

In another form of this embodiment, a computer program product including instructions is provided. When the instructions are executed, the method on the internet of vehicles server side in the foregoing method embodiments may be performed.

In another form of this embodiment, a chip is provided. The chip is coupled to a memory, and is configured to read and execute instructions stored in the memory. When the instructions are executed, the method on the internet of vehicles server side in the foregoing method embodiments may be performed.

In an implementation process, the steps of the methods in the embodiments may be performed by using a hardware integrated logic circuit in the processor, or by using instructions in a form of software. The steps of the method disclosed with reference to the embodiments of this application may be directly performed by a hardware processor, or may be performed by using a combination of hardware and software modules in the processor.

It should be noted that, the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another suitable type.

All or some of the foregoing embodiments may be implemented by using software, hardware, firmware, or any combination thereof. When software is used to implement the methods, all or a part of the methods may be implemented in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, or another programmable apparatus. The computer programs or instructions may be stored in a computer-readable storage medium, or may be transmitted through the computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid state disk, SSD).

Various illustrative logic units and circuits described in the embodiments of this application may implement or operate the described functions by using a general-purpose processor, a digital signal processor, an application specific integrated circuit (ASIC), a field programmable gate array (FPGA), or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM, a flash memory, a ROM, an EPROM, an EEPROM, a register, a hard disk, a removable disk, a CD-ROM, or any other storage medium in the art. For example, the storage medium may be connected to the processor, so that the processor can read information from the storage medium and write information into the storage medium. Optionally, the storage medium may alternatively be integrated into the processor. The processor and the storage medium may be disposed in an ASIC, and the ASIC may be disposed in an internet of vehicles terminal. Optionally, the processor and the storage medium may alternatively be disposed in different components of the internet of vehicles terminal.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although the embodiments of this application are described with reference to specific features, it is clearly that various modifications and combinations may be made to them without departing from the spirit and scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A dynamic information sending method carried out by an internet of vehicles (IOV) server, the method comprising:
    obtaining a path information of an IOV terminal planned by a navigation map;
    determining an indication range in a high definition map based on the path information; and
    sending first indication information indicating the dynamic information in the high definition map to the IOV terminal in accordance with whether the dynamic information is global dynamic information and whether the dynamic information is in the indication range corresponding to the path information such that the first indication information is:
        sent, in accordance with the dynamic information being global dynamic information, in a broadcasting manner in a broadcast format; and
        otherwise sent, in accordance with the dynamic information not being global dynamic information and being in the indication range based on the path information of the IOV terminal, in a unicast manner in a unicast format.

2. The method according to claim 1, wherein the first indication information in the unicast format comprises at least one type of information taken from the group consisting of:
    road identification information and road-level dynamic information corresponding to the road identification information; and
    lane identification information and lane-level dynamic information corresponding to the lane identification information, and the lane identification information includes road information and lane information.

3. The method according to claim 1, wherein the first indication information in the broadcast format comprises global-level dynamic information and information indicating a type of the global-level dynamic information.

4. The dynamic information sending method according to claim 1, wherein the method comprises:
    sending, to the IOV terminal in accordance with the dynamic information being associated with the path information, second indication information used to indicate that the dynamic information is associated with the path information.

5. The dynamic information sending method according to claim 1, wherein the sending indication information to the IOV terminal comprises:
    sending, in accordance with the dynamic information being low-timeliness dynamic information, the first indication information to the IOV terminal based on a first periodicity; or
    sending, in accordance with the dynamic information being high-timeliness dynamic information and a triggering of an event corresponding to the dynamic information, the first indication information to the IOV terminal.

6. The dynamic information sending method according to claim 1, wherein the dynamic information comprises at least one type of information taken from the group consisting of:
    traffic congestion information,
    traffic accident information,
    road condition information,
    passable state information,
    pedestrian road crossing information,
    bicycle road crossing information,
    pedestrian road occupation information, and
    motor vehicle road occupation information.

7. The dynamic information sending method according to claim 1, wherein the first indication information indicates at least two pieces of associated information content that are jointly coded, accordance with the dynamic information comprising the at least two pieces of associated information content.

8. The dynamic information sending method according to claim 1, wherein dynamic information in different maps corresponds to different scrambling codes or different initialization values.

9. A dynamic information handling method carried out by an internet of vehicles (IOV) terminal, the method comprising:
    receiving, from a first device, first indication information indicating dynamic information in a high definition map, wherein the first indication information is sent by the first device in accordance with whether the dynamic information is global dynamic information and whether the dynamic information is in an indication range in a high definition map based on a path information of the IOV terminal planned by a navigation map such that the first indication information is:
        sent by the first device, in accordance with the dynamic information being global dynamic information, in a broadcasting manner in a broadcast format; and
        otherwise sent by the first device, in accordance with the dynamic information not being global dynamic information and being in the indication range based on the path information of the IOV terminal, in a unicast manner in a unicast format;
    and
    updating the map based on the dynamic information and whether the dynamic information is associated with the path information.

10. The dynamic information handling method according to claim 9, wherein updating the map based on the dynamic information and whether the dynamic information is associated with the path information comprises:
updating road-level dynamic information or lane-level dynamic information in the map based on the dynamic information in accordance with the dynamic information is associated with the path information; or
updating global-level dynamic information in the map based on the dynamic information in accordance with the dynamic information is not associated with the path information.

11. The dynamic information handling method according to claim 9, wherein the first indication information indicates the path information in accordance with the dynamic information being associated with the path information.

12. The dynamic information handling method according to claim 9, wherein the method comprises:
receiving second indication information from the first device in accordance with the dynamic information being associated with the path information,
wherein the second indication information indicates that the dynamic information is associated with the path information.

13. The dynamic information handling method according to claim 9, wherein the receiving the first indication information comprises:
receiving, in accordance with the dynamic information being low-timeliness dynamic information, the first indication information from the first device based on a first periodicity; or
receiving, in accordance with the dynamic information being high-timeliness dynamic information and a triggering of an event corresponding to the dynamic information, the first indication information from the first device.

14. The dynamic information handling method according to claim 9, wherein the dynamic information comprises at least one type of information taken from the group consisting of:
traffic congestion information,
traffic accident information,
road condition information,
passable state information,
pedestrian road crossing information,
bicycle road crossing information,
pedestrian road occupation information, and
motor vehicle road occupation information.

15. The dynamic information handling method according to claim 9, wherein the first indication information indicates at least two pieces of associated information content that are jointly coded, in accordance with the dynamic information comprising the at least two pieces of associated information content.

16. The dynamic information handling method according to claim 9, wherein dynamic information in different maps corresponds to different scrambling codes or different initialization values.

17. An internet of vehicles (IOV) server comprising:
at least one processor; and
one or more non-transitory memories coupled to the at least one processor and storing program instructions for execution by the at least one processor to carry out a dynamic information sending method comprising:
obtaining a path information of an IOV terminal planned by a navigation map;
determining an indication range in a high definition map based on the path information; and
sending first indication information indicating the dynamic information in the high definition map to the IOV terminal in accordance with whether the dynamic information is global dynamic information and whether the dynamic information is in the indication range corresponding to the path information such that the first indication information is:
sent, in accordance with the dynamic information being global dynamic information, in a broadcasting manner in a broadcast format; and
otherwise sent, in accordance with the dynamic information not being global dynamic information and being in the indication range based on the path information of the IOV terminal, in a unicast manner in a unicast format.

18. The IOV server according to claim 17, wherein the first indication information in the unicast format comprises at least one type of information taken from the group consisting of:
road identification information and road-level dynamic information corresponding to the road identification information; and
lane identification information and lane-level dynamic information corresponding to the lane identification information, and the lane identification information includes road information and lane information.

19. The IOV server according to claim 17, wherein the first indication information in the broadcast format comprises global-level dynamic information and information indicating a type of the global-level dynamic information.

20. The IOV server according to claim 17, wherein the method comprises:
sending, to the IOV terminal in accordance with the dynamic information being associated with the path information, second indication information used to indicate that the dynamic information is associated with the path information.

21. The IOV server according to claim 17, wherein the sending indication information to the IOV terminal comprises:
sending, in accordance with the dynamic information being low-timeliness dynamic information, the first indication information to the IOV terminal based on a first periodicity; or
sending, in accordance with the dynamic information being high-timeliness dynamic information and a triggering of an event corresponding to the dynamic information, the first indication information to the IOV terminal.

22. The IOV server according to claim 17, wherein the dynamic information comprises at least one type of information taken from the group consisting of:
traffic congestion information,
traffic accident information,
road condition information,
passable state information,
pedestrian road crossing information,
bicycle road crossing information,
pedestrian road occupation information, and
motor vehicle road occupation information.

23. The IOV server according to claim 17, wherein the first indication information indicates at least two pieces of associated information content that are jointly coded, in accordance with the dynamic information comprising the at least two pieces of associated information content.

24. The IOV server according to claim 17, wherein dynamic information in different maps corresponds to different scrambling codes or different initialization values.

25. An internet of vehicles (IOV) terminal comprising:
at least one processor; and
one or more non-transitory memories coupled to the at least one processor and storing program instructions for execution by the at least one processor to carry out a method comprising:
receiving, from a first device, first indication information indicating the dynamic information in a high definition map, wherein the first indication information is sent by the first device in accordance with whether the dynamic information is global dynamic information and whether the dynamic information is in an indication range in a high definition map based on a path information of the IOV terminal planned by a navigation map such that the first indication information is:
sent by the first device, in accordance with the dynamic information being global dynamic information, in a broadcasting manner in a broadcast format; and
otherwise sent by the first device, in accordance with the dynamic information not being global dynamic information and being in the indication range based on the path information of the IOV terminal, in a unicast manner in a unicast format;
and
updating the map based on the dynamic information and whether the dynamic information is associated with the path information.

26. The IOV terminal according to claim 25, wherein the updating the map comprises:
updating road-level dynamic information or lane-level dynamic information in the map based on the dynamic information in accordance with the dynamic information is associated with the path information; or
updating global-level dynamic information in the map based on the dynamic information in accordance with the dynamic information is not associated with the path information.

27. The IOV terminal according to claim 25, wherein the first indication information indicates the path information in accordance with the dynamic information being associated with the path information.

28. The IOV terminal according to claim 25, wherein the method comprises:
receiving second indication information from the first device in accordance with the dynamic information being associated with the path information, second indication information indicates that the dynamic information is associated with the path information.

29. The IOV terminal according to claim 25, wherein the receiving the first indication information comprises:
receiving, in accordance with the dynamic information being low-timeliness dynamic information, the first indication information from the first device based on a first periodicity; or
receiving, in accordance with the dynamic information being high-timeliness dynamic information and a triggering of an event corresponding to the dynamic information, the first indication information from the first device.

30. The IOV terminal according to claim 25, wherein the dynamic information comprises at least one type of information taken from the group consisting of:
traffic congestion information,
traffic accident information,
road condition information,
passable state information,
pedestrian road crossing information,
bicycle road crossing information,
pedestrian road occupation information, and
motor vehicle road occupation information.

31. The IOV terminal according to claim 25, wherein the first indication information indicates at least two pieces of associated information content that are jointly coded, in accordance with the dynamic information comprising the at least two pieces of associated information content.

32. The IOV terminal according to claim 25, wherein dynamic information in different maps corresponds to different scrambling codes or different initialization values.

33. A non-transitory computer-readable storage medium, comprising a program, wherein when being executed by at least one processor, the program causes a first device to perform a dynamic information sending method comprising:
obtaining a path information of an IOV terminal planned by a navigation map;
determining an indication range in a high definition map based on the path information; and
sending first indication information indicating the dynamic information in the high definition map to the IOV terminal in accordance with whether the dynamic information is global dynamic information and whether the dynamic information is in the indication range corresponding to the path information such that the first indication information is:
sent, in accordance with the dynamic information being global dynamic information, in a broadcasting manner in a broadcast format; and
otherwise sent, in accordance with the dynamic information not being global dynamic information and being in the indication range based on the path information of the IOV terminal, in a unicast manner in a unicast format.

34. A non-transitory computer-readable storage medium, comprising a program, wherein when being executed by at least one processor, the program causes a IOV terminal to perform a method comprising:
receiving, from a first device, first indication information indicating dynamic information in a high definition map, wherein the first indication information is sent by the first device in accordance with whether the dynamic information is global dynamic information and whether the dynamic information is in an indication range in a high definition map based on a path information of the IOV terminal planned by a navigation map such that the first indication information is:
sent by the first device, in accordance with the dynamic information being global dynamic information, in a broadcasting manner in a broadcast format; and
otherwise sent by the first device, in accordance with the dynamic information not being global dynamic information and being in the indication range based on the path information of the IOV terminal, in a unicast manner in a unicast format;
and
updating the map based on the dynamic information and whether the dynamic information is associated with the path information.

35. The non-transitory computer-readable storage medium according to claim 34, wherein the updating the map comprises:
updating road-level dynamic information or lane-level dynamic information in the map based on the dynamic information in accordance with the dynamic information is associated with the path information; or updating, global-level dynamic information in the map based on the dynamic information in accordance with the dynamic information is not associated with the path information.

\* \* \* \* \*